(12) United States Patent
Barbone (10) Patent No.: US 12,266,095 B2
(45) Date of Patent: Apr. 1, 2025

(54) MONITORING OF PIPELINE SYSTEMS (71) Applicant: Georg Fischer Rohrleitungssysteme AG, Schaffhausen (CH)

(72) Inventor: Riccardo Barbone, Schaffhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 571 days.

(21) Appl. No.: 17/527,618

(22) Filed: Nov. 16, 2021

(65) Prior Publication Data

US 2022/0156907 A1   May 19, 2022

(30) Foreign Application Priority Data

Nov. 18, 2020 (EP) ..................................... 20208251

(51) Int. Cl.
*G06T 7/00* (2017.01)
*F17D 3/00* (2006.01)
*F17D 5/00* (2006.01)
*G06K 7/14* (2006.01)
*G06T 7/70* (2017.01)

(52) U.S. Cl.
CPC ................ *G06T 7/001* (2013.01); *F17D 3/00* (2013.01); *G06K 7/1417* (2013.01); *G06K 7/1443* (2013.01); *G06T 7/70* (2017.01); *G06T 2207/30108* (2013.01); *G06T 2207/30204* (2013.01)

(58) Field of Classification Search
None
See application file for complete search history.

(56) References Cited

U.S. PATENT DOCUMENTS

| 5,095,365 A | * | 3/1992 | Takatoo | G08B 21/187 |
| | | | | 348/208.99 |
| 10,443,772 B2 | | 10/2019 | Kishi et al. | |
| 2015/0117752 A1 | * | 4/2015 | Ueno | G06T 7/60 |
| | | | | 382/141 |
| 2016/0231284 A1 | * | 8/2016 | Shiina | G01N 29/043 |

(Continued)

FOREIGN PATENT DOCUMENTS

| CN | 107449470 | * | 12/2017 | ............. G01D 21/02 |
| CN | 209765567 | * | 12/2019 | ............... G06K 7/14 |

(Continued)

*Primary Examiner* — Beniyam Menberu
(74) *Attorney, Agent, or Firm* — Harness, Dickey & Pierce, P.L.C.

(57) ABSTRACT

A method and system for detecting displacements in installed pipeline systems and identifying components and their properties, comprising:
arranging/attaching a marker to at least one of the components of the installed pipeline system,
recording/scanning/photographing the marker (3) and generating a baseline image of the initial state,
assigning properties and data to and depositing them on the marker,
storing the baseline image at a memory location,
re-recording/re-scanning/re-photographing the marker,
autonomously detecting the marker and comparing it with the stored baseline image of the corresponding marker,
determining alterations or displacements of the marker,
outputting determined values,
wherein at least two markers are arranged such that they are recorded together on a baseline image.

11 Claims, 5 Drawing Sheets

(56) References Cited

U.S. PATENT DOCUMENTS

2017/0219422 A1* 8/2017 Hamano ................. G01V 8/10
2018/0350273 A1   12/2018 Walley, Jr.
2021/0390680 A1* 12/2021 Hamano ............... G01N 29/28

FOREIGN PATENT DOCUMENTS

| EP | 3567294 A1 | 11/2019 | | |
| JP | 2018205834 | * 12/2018 | ............... | G06K 1/12 |
| KR | 20050069222 | * 7/2005 | ............. | G01B 5/213 |

* cited by examiner

MONITORING OF PIPELINE SYSTEMS

CROSS-REFERENCE TO RELATED APPLICATION

This application claims priority to European Patent Application No. 20208251.7 filed Nov. 18, 2020, all of which is claimed in its entirety wherein.

FIELD OF THE INVENTION

The invention relates to a method and a system for detecting displacements in installed pipeline systems and identifying components and their properties, comprising:
arranging/attaching a marker on at least one of the components of the installed pipeline system,
recording/scanning/photographing the marker and generating a baseline image of the initial state,
storing the baseline image, preferably in a database,
assigning corresponding properties and data to the baseline image and storing them,
re-recording/re-scanning/re-photographing the marker,
autonomously detecting the marker and comparing it with the stored baseline image of the corresponding marker,
determining alterations or displacements of the marker,
outputting determined values.

BACKGROUND OF THE INVENTION

Pipeline systems are known from the prior art which comprise markers that allow the pipes and their positions to be identified. By detecting the marker, it is possible to evaluate which type of pipe was used. For example, the marker can be arranged on the inner circumference of the pipe and is detected by means of a sewage pipe robot, and the corresponding data, which was recorded and saved at the same time the pipe was laid, is displayed. This also allows the position of pipeline components that are installed under the ground to be determined by assigning the coordinates to the laid component during the installation.

US 2001/0029989 A1 discloses an alphanumeric marker for pipelines, which allows the position as well as the pipeline to be identified.

The systems known from the prior art technology allow the pipe to be identified and its position to be detected, but they do not allow any detection of changes in the pipeline system.

The object of the invention is to propose a method and an associated system that make it possible to detect stresses occurring in previously laid and installed pipeline systems at an early stage in order to prevent possible leaks or pipe breakages.

This object is achieved according to the invention by arranging at least two markers such that they are recorded together on a baseline image. In the system according to the invention at least two markers are arranged on the pipeline system, wherein two markers each form a pair, and the marker pair is recorded in a baseline image.

The method according to the invention for detecting displacements in installed pipeline systems and identifying components and their properties includes arranging or attaching a marker to at least one of the components of the installed pipeline system. Each marker is unique, non-interchangeable, and distinctive. The marker can be placed or attached by gluing, engraving, or in other known ways. Preferably, the marker is only applied once the pipeline system is fully installed, or at least this section of the pipeline system is firmly anchored.

The marker applied on the pipeline system is recorded or scanned or photographed and a baseline image of the initial state is generated or created. Whether recording, scanning or photographing is used depends on which tool is used to carry it out, a mobile device or a digital camera preferably being used for the purpose, wherein these can preferably be connected to a computer. Preferably, the marker is recorded or scanned or photographed in such a way that at least a subregion of the components of the pipeline system is visible on the baseline image. It is advantageous if a 3D scan is performed, as this allows good three-dimensional measurements of the installation, especially in the Z direction.

Properties and data are assigned to and deposited in the recorded marker, wherein the properties and data preferably relate to the corresponding component to which the marker is attached. For example, the location of the marker can also be deposited, in addition to information about the installer of the pipeline system or the time of installation, etc.

The baseline image is stored, preferably in a database, wherein it is advantageous if the stored baseline images or the stored data or the database can be accessed from anywhere, which would suggest a cloud-based solution. It is advantageous if the baseline image of the initial state is also assigned to and stored in the corresponding marker or marker pair.

By re-recording or re-scanning or re-photographing the marker, a follow-up image is preferably created. In addition, the marker, which is unique, is independently detected and the follow-up image is compared with the baseline image. The comparison is used to identify alterations or displacements of the marker relative to the baseline image. The determined values are then output accordingly. It is advantageous if the follow-up image and further follow-up images are also stored, which allows a history to be created that shows the alteration or displacement of the pipeline system at a point over a specific period of time.

The present method according to the invention includes at least two markers being arranged on a pipeline system in such a way that they are recorded together on a baseline image. This allows the detection of the displacement of the two markers relative to each other. This can be used to determine how a marker has shifted, or in which directions, and how far it has shifted compared to the other. This can be used to determine how the positions of the pipeline system and its components have altered or moved. The method according to the invention enables the detection of a displacement of the markers in the horizontal and vertical directions as well as in terms of depth, or in the X, Y and Z directions. An angular displacement $\theta$ can also be detected and evaluated using the method according to the invention.

It is advantageous if a QR code is used for the marker. The uniqueness of such a QR code means it is unambiguously recognised. In addition, the geometric structure of the code makes it a simple matter to determine the displacement and the definition of the displacement or alteration in the X, Y, and Z direction, or horizontally, vertically or in terms of depth, and angular displacements can also be easily determined and defined.

In a preferred embodiment at least two markers are arranged on different components or on one component and one structural element. This makes a displacement of the components relative to each other clearly visible. The structural element can be a wall, a floor, a ceiling or a pillar, or other stable structure to which a pipeline system is typically fastened.

Preferably, two markers are arranged, the two markers forming a pair which is recorded on the baseline image. This means one marker forms the "master" and the other marker the "slave", which makes it a simple matter to determine the displacement of the markers in the respective direction X, Y and Z. Each follow-up image is stored accordingly, which means that a gradual displacement can be detected.

Preferably, the continuous monitoring by means of the recorded follow-up images can be used to set an automatic alarm, for example, which triggers when a certain value of the displacement has been reached or exceeded, for example. The way in which this alarm is issued is to be handled on an individual basis, whether by means of a notification to the pipeline system maintenance, or a warning light, or some other known alarm system.

The determined values of the displacement or alteration occurring in the position of the marker will preferably be input into a calculation for assessing the displacement and/or making a recommendation to suppress a displacement of the pipeline system at the appropriate point. An algorithm is preferably used for the calculation.

It is advantageous if the determined values use an algorithm to calculate an assessment of the displacement and/or make a recommendation for reducing the displacement. This allows measures to be taken at an early stage to prevent the pipe system from leaking, or cracks from forming or screw fixings from coming loose, as well as preventing other unwanted problems with the pipeline system. In a further embodiment of the method the algorithm is continuously optimised and is thus self-learning.

The system according to the invention for detecting displacements in installed pipeline systems and for identifying components and their properties includes an installed pipeline system and its components, such as pipes, valves, fittings, couplings etc., and fastening elements as well as structural elements to which the fastening elements are fixed. In addition, the system includes markers, wherein at least two markers are arranged on the pipeline system and are preferably attached after the pipeline system has been installed. Two markers each form a pair, the marker pair being recorded in a baseline image. The baseline image documents the initial state, immediately after the installation of the pipeline. The pipeline system is a system which is not buried in the ground but instead is anchored to structural elements, such as walls, ceilings, floors, or other solid elements by means of fastening elements and is more or less accessible, in particular accessible to the extent that images of the markers can be recorded.

It is advantageous if the marker is formed by a QR code. This provides the advantage that each marker is unique and therefore not interchangeable. The required data and properties are then deposited in the marker or QR code, as described above.

According to a preferred embodiment, one marker of the marker pair is arranged on one component of the pipeline system and the other marker is arranged on another component or on a structural element or fastening element. Since displacements and alterations usually occur between the individual components in the pipeline system, it is advantageous if the markers of the marker pair, which are implemented as QR codes, are not arranged on the same component.

It is advantageous if the system includes a mobile terminal and/or a digital camera for recording/scanning/photographing the marker. It is also advantageous if the system comprises a memory that allows the recorded images, such as baseline images and follow-up images, to be stored.

Furthermore, it is advantageous if the system comprises a computing unit that allows the images to be appropriately evaluated using an algorithm, as described above.

According to a preferred embodiment, the mobile terminal also enables the determined values to be output as well as evaluated and, if available, a recommendation to be made for reducing the pipeline displacement.

All design options can be freely combined with one another, and features of the method and features of the system can also be combined with one another.

DESCRIPTION OF THE DRAWINGS

An exemplary embodiment of the invention will be described on the basis of the figures, although the invention is not limited to the exemplary embodiment. In the drawings.

DESCRIPTION OF THE PREFERRED EMBODIMENTS

Figure 1:
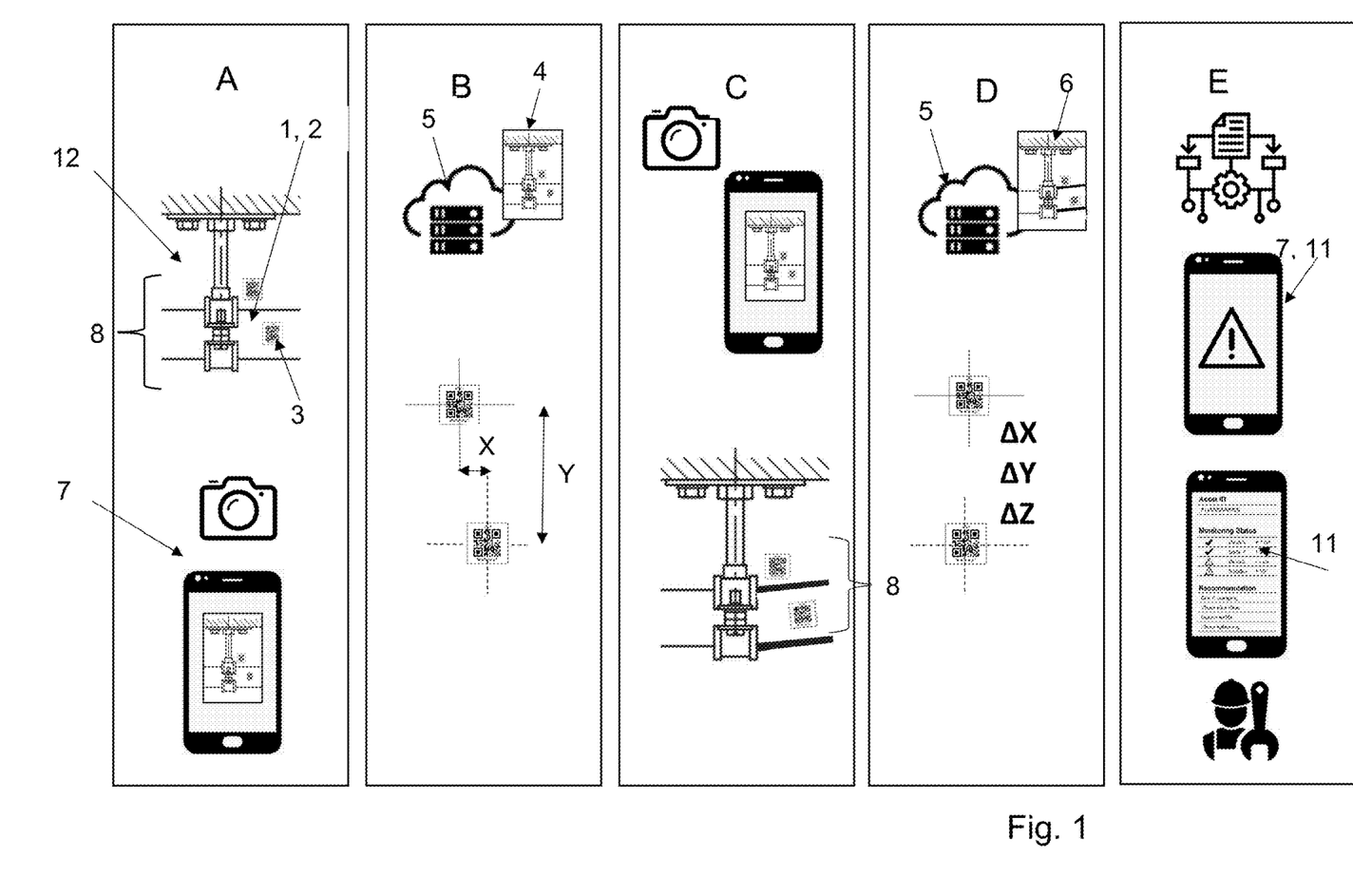
FIG. 1 shows a diagram of the method according to the invention.
Figure 3:
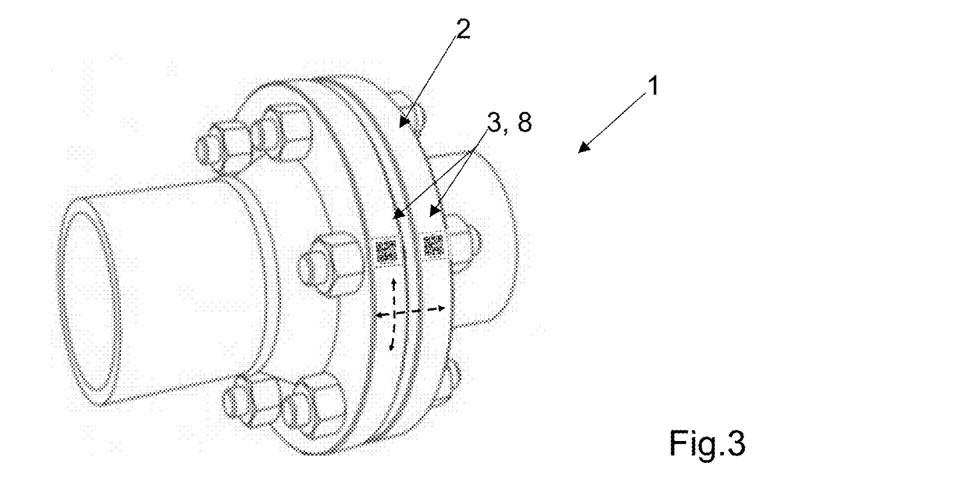
FIG. 3 shows an example of a possible arrangement of a marker pair.
Figure 4:
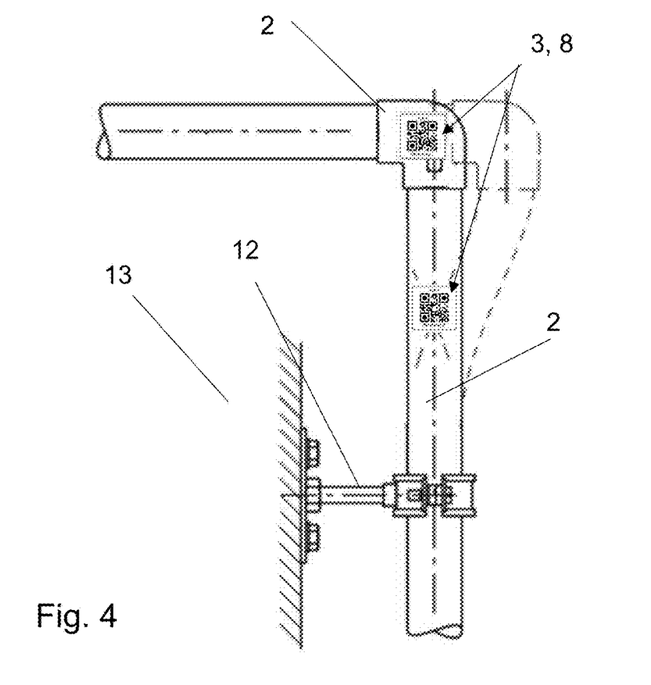
FIG. 4 shows an example of a possible arrangement of a marker pair.
Figure 5:
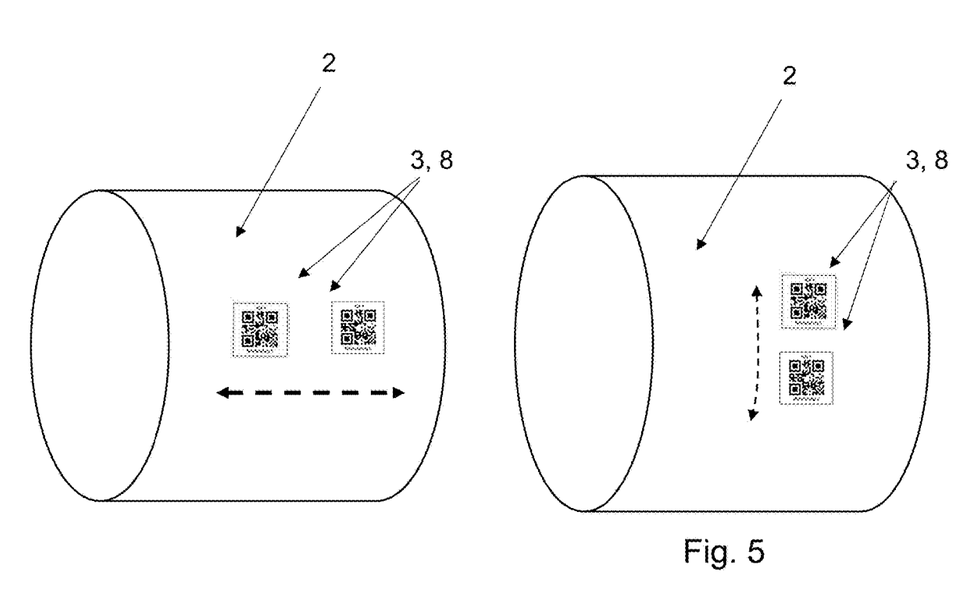
FIG. 5 shows an example of a possible arrangement of a marker pair.

FIG. 1 shows the method according to the invention in schematic form. In section A, it can be seen that markers 3 are arranged on components 2 of the pipeline system 1 or also on structural elements 13, such as walls, pillars, etc., wherein the markers can of course be arranged on any possible component of the pipeline system 1. In FIGS. 3 to 5 further possibilities are disclosed for arranging markers 3, which are preferably implemented as QR codes, on components 2 of the pipeline system 1, although this configuration is of course not exhaustive. In addition, in A it is indicated that the marker 3, which is preferably implemented as a QR code, is recorded or scanned or photographed, preferably with a mobile device 7 or a digital camera 7. From this, a baseline image 4 is created which records the initial state of the pipeline 1 at this position or with the detected components 2 and/or structural elements 13; this can be discerned from section B. The baseline image 4 records the exact position and alignment of the two markers 3 relative to each other. In addition, properties and data are assigned to and deposited in the markers 3. These include, for example, properties of the respective component, properties of the pipeline, location, etc. The baseline image 4 is preferably stored in a database 5 or other memory location, although it is advantageous if there is the possibility of remote access and various users can access it, which also suggests the possibility of storage in a cloud. In order to detect whether an alteration or displacement has occurred in the pipeline system 1, the marker is recorded or scanned or photographed once again, as shown in section C. The two markers 3, i.e. the same marker pair 8, are recorded once again, preferably again using a mobile terminal or a digital camera that can be connected to a computer. With the aid of a computing unit, the identity of the marker 3 or marker pair 8 in question is independently recognized and at the same time the positions of the markers are compared, as can be discerned from section D. In addition, it is advantageous if the repeat recording of the marker pair 8 is also stored as a follow-up image 6 and further follow-up images 6 can also be created and stored, wherein a resulting displacement or alteration of the pipeline system 1 can be observed in the corresponding components 2.

The determined values ΔX, ΔY, ΔZ, θ of the displacement are then output 11, this can also be displayed on a mobile terminal 7 or by another display device, as shown in section E. However, it is also possible to dispense with a visual output of the values and the values are then processed immediately or used for further calculations or simply saved for the time being. Preferably, the method according to the invention can be used to monitor a pipeline system 1 by recording regular follow-up images 6 and automatically determining the displacement, on the basis of which an alarm can also be set which is triggered when a value of the displacement is reached or exceeded. Maximum values should be defined and stored for this purpose. When the alarm is triggered, for example, a responsible person can be automatically informed via a mobile terminal, while other known forms of the alarm are also conceivable. In addition, it is advantageous if the method comprises an algorithm that allows an assessment of the displacement to be output based on the values of the displacement between the baseline image and the follow-up image of the marker pair 8, and/or a recommendation as to how the displacement can be reduced, or what can be improved, for example, in relation to the mounting 12 of the pipeline system, or other recommendations.

Figure 2:
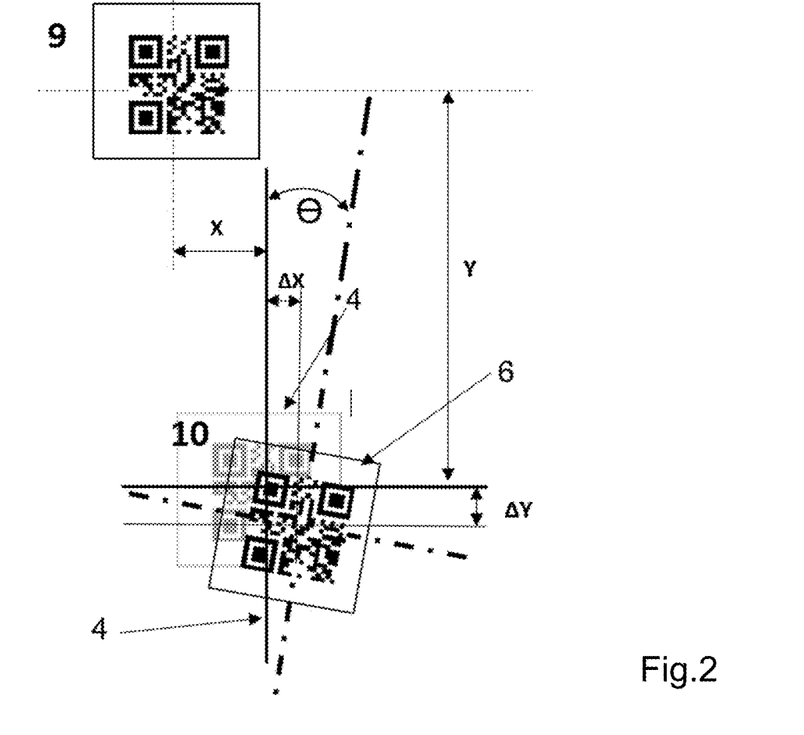
FIG. 2 shows a marker pair with master and slave.
Figure 7:
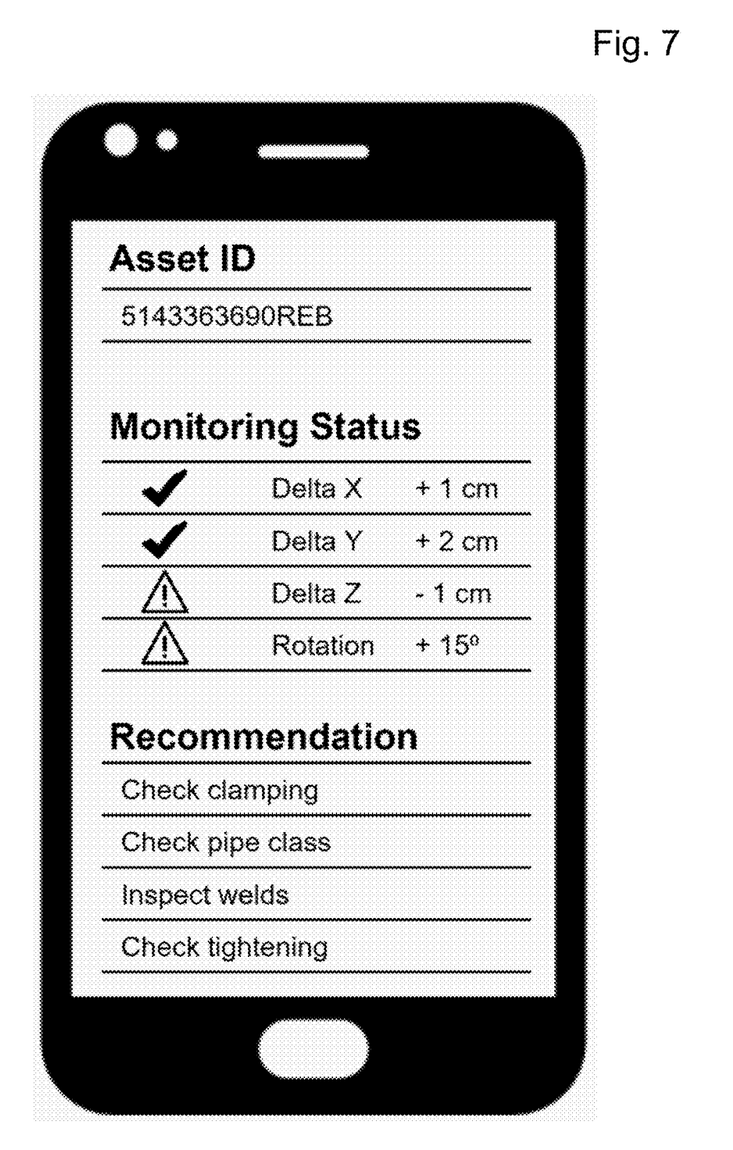
FIG. 7 shows a terminal with possible displays.

FIG. 2 shows how the values ΔX, ΔY, ΔZ, θ are preferably determined. For this purpose it is advantageous if one of the two markers is defined as the master 9 and the other marker of the pair 8 as the slave 10. This allows the displacement of the markers 3 relative to each other in the directions X, Y and Z as well as an angular displacement θ to be well defined and calculated, wherein only the directions X, Y and the angular displacement θ are shown here, the direction Z here is the depth, which can of course be determined in the same way. Not all values need to be determined, sometimes only two are sufficient. As already mentioned, angular displacements θ can also be detected. FIG. 2 shows that the follow-up image 6 of the slave 10 has shifted relative to the baseline image 4 (represented by two broad lines crossing over a grey QR code) of the slave 10 by ΔX, ΔY and an angular displacement θ. These values are then output and/or also stored accordingly. This can be used to assess the position or to make a recommendation and an alarm can be set up that triggers when a specific value is exceeded. As an example, FIG. 7 shows a mobile terminal 7 with possible outputs.

FIG. 3 shows a flange coupling as a possible component 2 of the pipeline 1, on each flange of which a marker 3 is arranged and these markers form a marker pair 8. FIG. 4 shows a pipeline 1 fastened to a structural element 13, in which the markers 3 have been attached to an elbow piece and a pipe. The markers 3 are attached after the pipeline system 1 has been completely laid, the components 2 or structural elements 13 on which they are attached being usually decided by the installer. As a rule, components 2 and structural elements 13 are selected in which a displacement or alteration of the pipeline 1 is easily recognizable and which, due to their position or installation, are also most likely to be affected and represent a weak point for leakages. Fastening elements 12 which attach a pipeline 1 to a structural element 13 are common.

As a further potential application of the method according to the invention, markers 3 or marker pairs 8 can also be arranged next to one another on a pipe, as shown in FIG. 5. This allows an extension or shrinkage to be detected, as in the first picture, or an enlargement of the pipe, as in the second picture of FIG. 5

Figure 6:
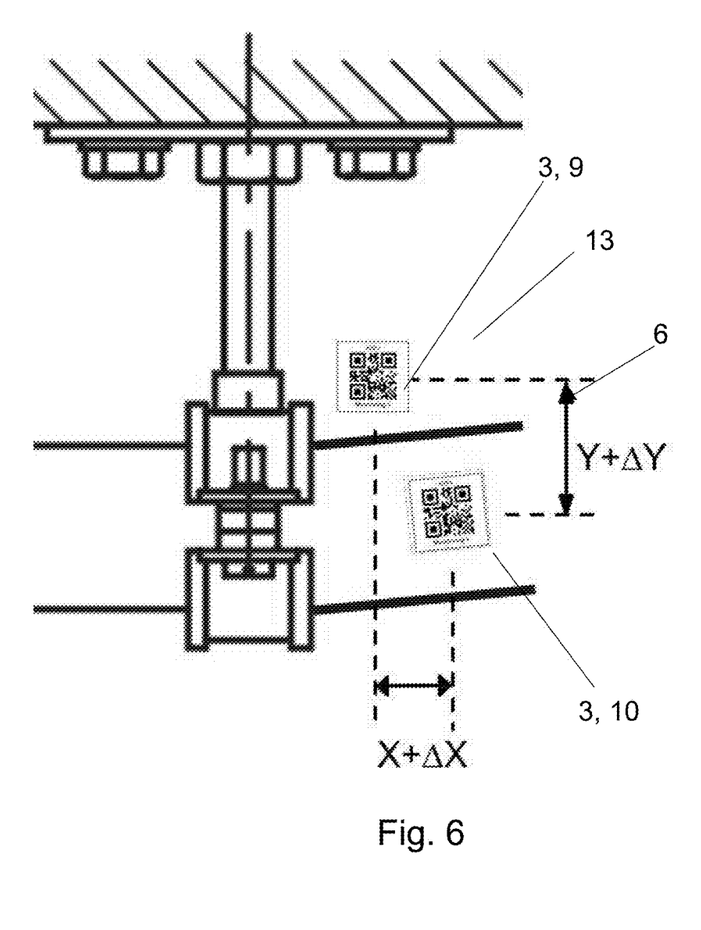
FIG. 6 shows an indicated displacement in a pipeline.

FIG. 6 shows the system according to the invention for detecting a displacement or alteration in an installed pipeline system 1. The system includes an installed pipeline system 1 with components 2, fastening elements 12, and markers 3. The markers 3, which are preferably implemented as QR codes, each form a marker pair 8 which is recorded in a baseline image 4. The baseline image is a picture of the initial state and is stored accordingly and kept as a comparison value. It is also clear from FIG. 6 that an alteration of a component 2 has occurred. The first figure shows the baseline image 4 and the second shows the displacement by the values ΔX and ΔY, which are then preferably recorded in a follow-up image 6 for comparison.

What is claimed is:

1. A method for detecting displacements in installed pipeline systems (1) and for identifying components (2) and their properties, comprising:

arranging/attaching a marker (3) on different components (2) or on one component (2) and one structural element (13), of the installed pipeline system (1), recording/scanning/photographing the markers (3) and generating a baseline image (4) of their initial state, assigning properties and data to and depositing them on the markers (3), storing the baseline image (4) at a memory location (5), re-recording/re-scanning/re-photographing the markers (3), independently detecting the markers (3) and comparing it with the store baseline image (4) of the corresponding markers (3), determining alterations or displacements of the marker (3), outputting (11) determined values (ΔX, ΔY, ΔZ, θ);

wherein at least two markers are arranged such that they are recorded together on a baseline image (4); and wherein a recommendation (11) for reducing a displacement of the pipeline system (1) at the corresponding point is made based on the determined values (ΔX, ΔY, ΔZ).

2. A method according to claim 1, a follow-up image (6) is created when the marker (3) is re-recorded/re-scanned/re-photographed.

3. A method according to claim 1, wherein the marker (3) is formed by a QR code.

4. A method according to claim 3 wherein the QR code markers are arranged on a pipe and on a structural element adjacent to the pipe.

5. A method according to claim 1, wherein two markers (3) are arranged, wherein the markers (3) form a pair (8) which is recorded on the baseline image (4).

6. A method according to claim 1, wherein an assessment (11) of the displacement at the corresponding point is also made based on the determined values (ΔX, ΔY, ΔZ).

7. A method according to claim 1, wherein an evaluation (11) of the displacement and/or recommendation (11) for reducing the displacement is created by means of the determined values (ΔX, ΔY, ΔZ) and/or angular displacements θ and an algorithm.

8. A method according to claim 1, wherein the recording/scanning/photographing are carried out by means of a mobile terminal (7) or a digital camera (7).

9. A system for detecting displacements in installed pipeline systems (1) and for identifying components (2) and their properties, comprising:

an installed pipeline system (1), its components (2), fastening elements (12), structural elements (13) and markers (3), wherein at least two QR code markers (3) are arranged on the pipeline system (1), and wherein the two QR code markers (3) each form a marker pair (8), the marker pair (8) being recorded in a baseline image (4), determining alterations or displacement of the QR code markers by scanning the markers, detecting the markers and comparing it with the baseline image, outputting determined values relating to the alterations or displacement of the QR code markers, and wherein the system further comprises an analyzer for analyzing the determined values to provide a recommendation for reducing displacement in the pipeline system.

10. A system according to claim 9, wherein one marker (3) of the marker pair (8) is arranged on each component (2) of the pipeline system (1) or on one component (2) and one structural element (13).

11. A system according to claim 9, wherein the system contains a mobile terminal (7) and/or a digital camera (7) for recording/scanning/photographing the marker (3).

\* \* \* \* \*